United States Patent [19]
Yamashita et al.

[11] Patent Number: 5,537,216
[45] Date of Patent: Jul. 16, 1996

[54] CIRCUIT FOR INCLUDING A COPY-INHIBIT SIGNAL WITH A VIDEO SIGNAL

[75] Inventors: Keitaro Yamashita, Tokyo; Masatoshi Kawano, Kanagawa, both of Japan

[73] Assignee: Sony Corporation, Tokyo, Japan

[21] Appl. No.: 433,588

[22] Filed: May 3, 1995

Related U.S. Application Data

[62] Division of Ser. No. 71,325, Jun. 2, 1993, which is a continuation of Ser. No. 824,397, Jan. 23, 1992, abandoned.

[30] Foreign Application Priority Data

Jan. 31, 1991 [JP] Japan .................................. 3-031642

[51] Int. Cl.$^6$ .............................. H04N 5/76; H04N 7/167
[52] U.S. Cl. .................... 358/335; 380/7; 360/60
[58] Field of Search ..................... 358/335, 310, 358/342; 380/7, 5, 10, 15; 360/60

[56] References Cited

U.S. PATENT DOCUMENTS

| | | |
|---|---|---|
| 4,064,536 | 12/1977 | Saeki et al. . |
| 4,218,696 | 8/1980 | Ushio et al. . |
| 4,475,129 | 10/1984 | Kagota . |
| 4,488,183 | 12/1984 | Kinjo . |
| 4,623,918 | 11/1986 | Chomet . |
| 4,631,603 | 12/1986 | Ryan . |
| 4,748,667 | 5/1988 | Farmer et al. . |
| 4,819,098 | 4/1989 | Ryan . |
| 4,825,467 | 4/1989 | Rist et al. ................................... 380/7 |
| 4,903,297 | 2/1990 | Rist et al. . |
| 4,907,093 | 3/1990 | Ryan . |
| 5,022,078 | 6/1991 | Zelenz . |
| 5,144,453 | 9/1992 | Suga et al. . |
| 5,223,942 | 6/1993 | Sakaegi et al. . |
| 5,235,640 | 8/1993 | Devries et al. ............................ 380/13 |

Primary Examiner—Thai Q. Tran
Assistant Examiner—Robert Chevalier
Attorney, Agent, or Firm—William S. Frommer; Alvin Sinderbrand

[57] ABSTRACT

A spurious signal SSP whose frequency spectrum is located at frequencies [(N+(½))·fh] is multiplexed with a luminance signal Y so as to keep an interleaved relation between the spurious signal SSP and the luminance signal Y and the resultant signal is transmitted. When the spurious signal SSP is detected, the recording operation is inhibited. The spurious signal SSP is multiplexed with the luminance signal Y at a level such as not to exert an influence on the picture quality when the video signal is reproduced and seen by a monitor screen.

3 Claims, 4 Drawing Sheets

CIRCUIT FOR INCLUDING A COPY-INHIBIT SIGNAL WITH A VIDEO SIGNAL

This application is a division of application Ser. No. 08/071,325, filed Jun. 2, 1993, which is a continuation of Ser. No. 08/824,397 filed Jan. 23, 1992 now abandoned.

BACKGROUND OF THE INVENTION

1. Field of the Invention

The invention relates to a signal synthesizing circuit to prevent copying and a detecting circuit and, more particularly, to a signal synthesizing circuit to prevent copying and a detecting circuit which are suitable for use in a video tape recorder (hereinafter, referred to as a VTR).

2. Description of the Prior Art

An example of the prior art to prevent copying of a video signal is shown in FIG. 1. That is, a video signal reproduced by a VTR 75 on the reproducing or playback side is separated into component signals Y, PB, and PR and supplied from the VTR 75 on the playback side to a VTR 76 on the recording side through terminals 78 to 80. A copy inhibition signal SCG to specify permission or inhibition of copying the video signal is supplied from the VTR 75 on the playback side to the VTR 76 on the recording side through a terminal 77. In the VTR 76 on the recording side, the video signal is recorded or the recording of the video signal is inhibited in accordance with the content of the copy inhibition signal SCG.

According to the above prior art, in place of the copy inhibition signal SCG, when a signal corresponding to a copy permission signal, for instance, (DC voltage at a high level of +5 V) is supplied to a terminal for receiving the copy inhibition signal provided for the VTR 76 on the recording side, there is a problem in that copy of the video signal is enabled irrespective of the content of the copy inhibition signal SCG.

In the above prior art, where circuitry, cables, terminals, and the like of another system different from those for the video signal are provided and the copy inhibition signal SCG must be supplied from the VTR 75 to the VTR 76. Thus, the system becomes complicated and costs rise. Further, the above prior art has a problem in that it is difficult to use as a general standard because the copy inhibition can be extremely easily cancelled.

OBJECT AND SUMMARY OF THE INVENTION

It is, therefore, an object of the invention to provide a signal synthesizing circuit to prevent copying and a detecting circuit in which copying of a video signal can be easily inhibited with certainly.

According to an aspect of the invention, there is provided a signal synthesizing circuit to inhibit copying, in which a spurious signal SSP whose frequency spectrum is located at a frequency $[(N+(½))\cdot fh]$ is multiplexed to a luminance signal Y and transmitted so as to keep an interleaved relation between the spurious signal SSP and the luminance signal Y.

DETAILED DESCRIPTION OF THE PREFERRED EMBODIMENTS

Figure 2:
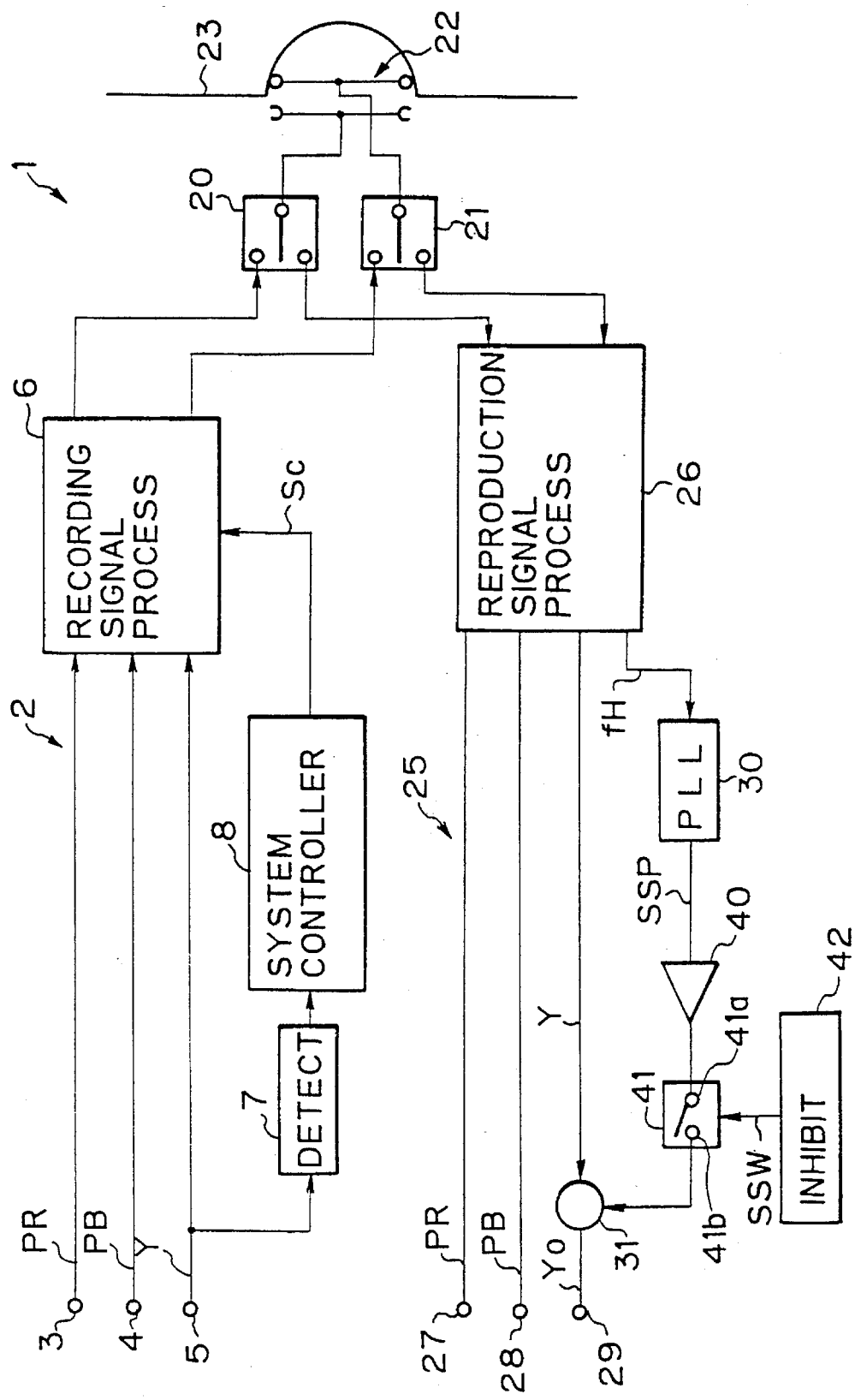
FIG. 2 is a block diagram of a video tape recorder according to the invention.

An embodiment of the invention will be described hereinbelow with reference to FIGS. 2 to 5. In the embodiment, an example of a VTR which can record and reproduce a high-vision video signal will be explained. FIG. 2 shows a VTR 1 having a signal synthesizing circuit and a detecting circuit according to the invention.

A recording system 2 of the VTR 1 will be first explained. Analog luminance signal Y and color difference signals PR and PB are supplied to the VTR 1 from a decoder, another VTR, a television receiver, or the like (not shown). The color difference signal PR is supplied to a recording signal processing circuit 6 through a terminal 3. The color difference signal PB is supplied to the recording signal processing circuit 6 through a terminal 4. The luminance signal Y is supplied to the recording signal processing circuit 6 and a detecting circuit 7 through a terminal 5. The detecting circuit 7 detects whether the spurious signal SSP as a copy inhibition signal has been multiplexed to the luminance signal Y while keeping the interleaved relation or not.

Figure 3:
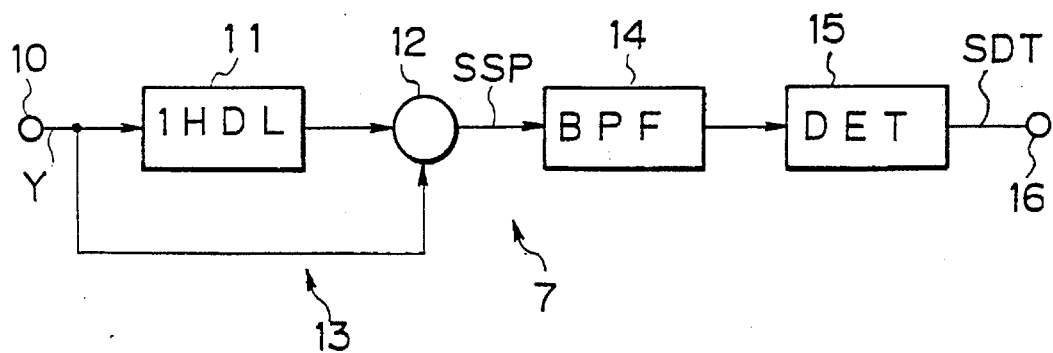
FIG. 3 is a block diagram of a detecting circuit.

FIG. 3 shows a construction of the detecting circuit 7. In the construction of FIG. 3, the luminance signal Y which is supplied through a terminal 10 is supplied to a 1 H delay circuit 11 and an arithmetic operating circuit 12. The circuits 11 and 12 construct a comb-shaped filter 13.

Figure 1:
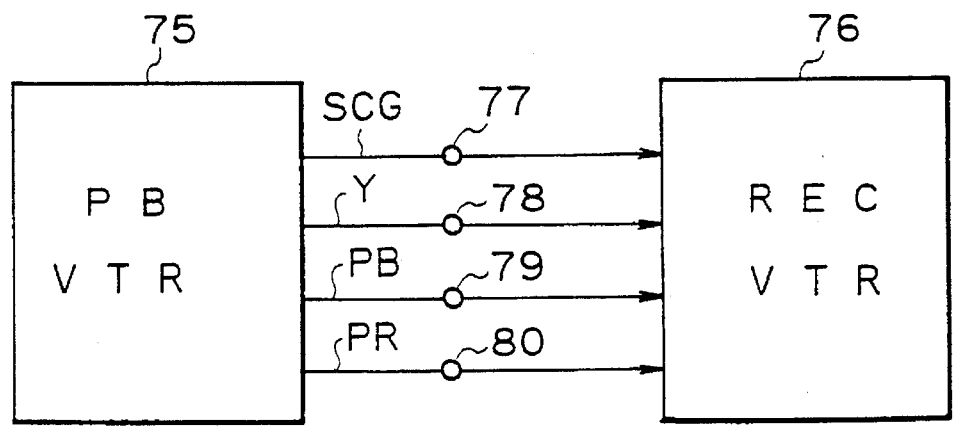
FIG. 1 is a schematic block diagram for explaining the prior art.
Figure 5:
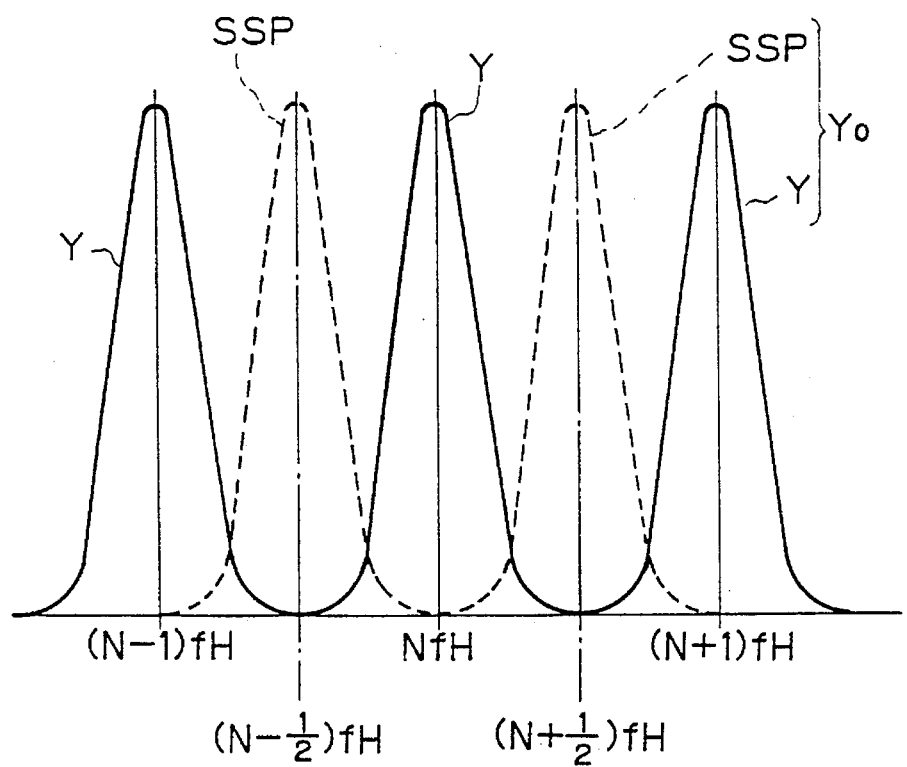
FIG. 5 is an explanatory diagram showing the interleaved relation between the luminance signal and the spurious signal.

A frequency spectrum of the luminance signal Y is shown in FIG. 5. A multiplexing state of the spurious signal SSP and the detection of the spurious signal SSP will now be described hereinbelow with reference to FIG. 5. As shown by solid lines, the frequency spectrum of the luminance signal Y exists every horizontal scanning frequency fh, that is, at the frequency positions of $N\cdot fh$. N is an arbitrary positive integer.

The spurious signal SSP shown by broken lines in FIG. 5 is inserted in the copy inhibited video signal at the frequency positions of $[(N+(½))\cdot fh]$. That is, in the example of FIG. 5, the spurious signal SSP having the spectrum at the frequencies $[(N+(½))\cdot fh]$ is inserted to the luminance signal Y having the spectrum at the frequencies $(N\cdot fh)$ while keeping the interleaved relation. Therefore, the spurious signal SSP can be separated by using the comb-shaped filter 13.

Since it is sufficient that the spurious signal SSP can be detected, it is not always necessary to multiplex it to a wide band. The signal to which the spurious signal SSP is multiplexed is not limited to the luminance signal Y but may be also the color difference signals PR and PB.

A subtraction between the signal components of the adjacent horizontal scan lines is performed by the comb-shaped filter 13. Since there is the in-phase relation between the phases of the luminance signals Y of the adjacent horizontal scan lines due to the line correlation, the component of the luminance signal Y is eliminated by the subtraction between the luminance signals Y. On the other hand, since there is the opposite relation between the phases of the spurious signals SSP of the adjacent horizontal scan lines, the component of the spurious signal SSP remains due to the subtraction between the spurious signals SSP. Such remaining component of the spurious signal SSP is supplied to a band pass filter 14.

The band pass filter 14 has characteristics such as to allow the signal components of a predetermined band width in which the frequency $[(N+(½))\cdot fh]$ is used as a center to pass. Therefore, when the component of the spurious signal SSP is supplied, the component of the spurious signal SSP passes through the band pass filter 14 and is supplied to a detecting circuit 15.

The detecting circuit 15 detects the spurious signal SSP. When the spurious signal SSP is detected, a high level signal, for instance, is supplied to a system controller 8 as a detection signal SDT through a terminal 16. When the spurious signal SSP is not detected, for example, a low level signal is supplied as a detection signal SDT to the system controller 8 through the terminal 16.

When the high level signal indicative of the detection of the spurious signal SSP is supplied as a detection signal SDT, the system controller 8 forms a control signal Sc to inhibit the recording operation of the recording signal processing circuit 6. The control signal Sc is supplied to the recording signal processing circuit 6.

The recording signal processing circuit 6 frequency modulates the luminance signal Y and the color difference signals PR and PB. The frequency modulated luminance signal Y and color difference signals PR and PB are supplied to a magnetic head 22 through a recording amplifier (not shown) and switching circuits 20 and 21 and recorded onto a magnetic tape 23.

When the control signal Sc is supplied from the system controller 8, the signal processing and recording operations in the recording signal processing circuit 6 are stopped.

Although the embodiment has been described with respect to an example of analog signal processing, the invention is not limited to such an example but digital signal processing can be also executed. In the case of the digital signal processing, for instance, after the analog signals are converted into digital signals, error correction codes are added to the digital signals, the resultant digital signals are modulated and supplied to the magnetic head 22 through the recording amplifier (not shown) and the switching circuits 20 and 21 and recorded onto the magnetic tape 23. The number of magnetic heads 22 can also be properly set as necessary.

A reproducing system 25 of the VTR 1 will now be described. In the case of inhibiting the copy of the video signal, the spurious signal SSP is multiplexed in the reproducing system 25.

The video signal reproduced from the magnetic tape 23 by the magnetic head 22 is supplied to a reproduction signal processing circuit 26 through the switching circuits 20 and 21. The luminance signal Y and the color difference signals PR and PB are reproduced by the reproduction signal processing circuit 26, respectively. The color difference signals PR and PB are taken out from terminals 27 and 28. The luminance signal Y is supplied to an arithmetic operating circuit 31. Further, the signal of the horizontal frequency fh extracted from the video signal is supplied to a PLL circuit 30.

Figure 4:
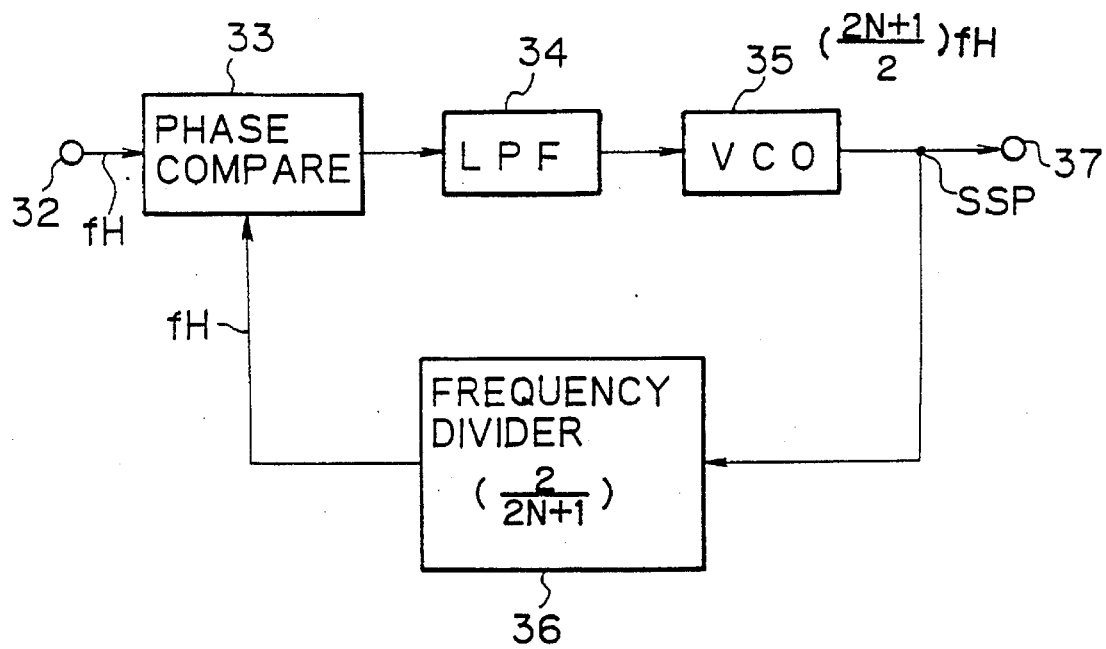
FIG. 4 is a block diagram of a PLL circuit.

The PLL circuit 30 forms the spurious signal SSP as a copy inhibition signal. FIG. 4 shows a construction of the PLL circuit 30. In the construction of FIG. 4, the reproduced signal of the horizontal frequency fh which is supplied through a terminal 32 is transmitted to a phase comparing circuit 33. The phase comparing circuit 33 compares the phases of the reproduced signal of the horizontal frequency fh mentioned above and the signal of the frequency fh which is supplied from a frequency dividing circuit 36, thereby forming a phase difference. The phase difference is supplied to a VCO 35 through a low pass filter 34. The VCO 35 forms the spurious signal SSP of the frequency $[(N+(½))\cdot fh]$. As shown in FIG. 5, the spurious signal SSP has a plurality of high frequency components. The spurious signal SSP is taken out from a terminal 37 and supplied to a terminal 41a of a switching circuit 41 through a buffer 40 and also supplied to the frequency dividing circuit 36.

Since the frequency of the spurious signal SSP is equal to $[(N+(½))\cdot fh]$, it will be understood that the phase is inverted every line. The frequency of the spurious signal SSP is not limited to that in the example mentioned above but can be also set to, for example, $[(N+(½))\cdot fh\pm(fv/2)]$, wherein fv denotes a vertical scanning frequency.

In the frequency dividing circuit 36, the frequency of the spurious signal SSP which is generated from the VCO 35 is divided at a predetermined frequency dividing ratio $[(2/(2N+1))]$, so that the signal of the horizontal frequency fh is derived from the frequency dividing circuit 36 and is returned to the phase comparing circuit 33.

In the case where the copy of the reproduced video signal is inhibited, an inhibition control circuit 42 produces, for instance, a high level switch control signal SSW and supplies to the switching circuit 41. On the other hand, in the case where the copy of the reproduced video signal is not inhibited, the inhibition control circuit 42 forms, for example, a low level switch control signal SSW and supplies to the switching circuit 41. When the switch control signal SSW is at the high level, the switching circuit 41 connects terminals 41a and 41b, thereby closing the switching circuit 41. At this time, the above spurious signal SSP is supplied to the arithmetic operating circuit 31 through the buffer 40 and switching circuit 41. When the switch control signal SSW is at the low level, the terminals 41a and 41b are not connected and the switching circuit 41 is opened, so that the spurious signal SSP is not supplied to the operating circuit 31.

The arithmetic operating circuit 31 multiplexes the spurious signal SSP to the luminance signal Y which is supplied from the reproduction signal processing circuit 26, thereby forming a luminance signal Y0. The luminance signal Y0 is taken out from a terminal 29. In the case where the spurious signal SSP is not supplied, the luminance signal Y which is supplied from the reproduction signal processing circuit 26 is directly transferred to the terminal 29 and is taken out from the terminal 29. The color difference signal PR which is taken out from the terminal 27, the color difference signal PB which is taken out from the terminal 28, and the luminance signal Y0 which is taken out from the terminal 29 are supplied to a monitor display (not shown), so that the reproduced video signal can be displayed.

A mixing ratio (level ratio) of the spurious signal SSP to the luminance signal Y is set at a level such that the spurious signal can be sufficiently detected without causing a visual problem. Thus, the recording of the video signal whose copy is inhibited can be inhibited. Upon reproduction, when the video signal is displayed on the monitor and is observed, it is possible to prevent visual influence of the video signal.

Both in the case where the luminance signal Y0 to which the spurious signal SSP is multiplexed is supplied as well as the case where the luminance signal Y to which the spurious signal SSP is not multiplexed is supplied, by adjusting the mixing ratio or by eliminating the spurious signal SSP by the comb-shaped filter having characteristics opposite to those of the comb-shaped filter 13 of the recording system 2, an adverse visual influence doesn't occur when the video signal is seen by the monitor and an erroneous operation of the monitor can be also prevented.

Consequently, in the case where the copy of the reproduced video signal is inhibited, the frequency spectrum of the spurious signal SSP is located at the frequency [(N+(½))·fh]. As shown in FIG. 5, the interleaved relation is maintained between the spurious signal SSP and the luminance signal Y.

According to the embodiment, by multiplexing the spurious signal SSP with the video signal, for example, the luminance signal Y in a state in which the interleaved relation is maintained, the copy of the video signal can be certainly and easily inhibited. Since the spurious signal SSP as a copy inhibition signal is multiplexed with the luminance signal Y and transmitted, there is no need to provide a circuit, cables, terminals, and the like of another system different from that of the video signal as in the prior art. It is thus possible to prevent consequent system complication and increased cost. The comb-shaped filter must be used to eliminate the spurious signal SSP as a copy inhibition signal, so that the costs rise. The copy preventing function, therefore, can be certainly maintained and can be easily standardized. Further, since the spurious signal SSP as a copy inhibition signal is multiplexed to the luminance signal Y at a level such as not to exert an influence on the picture quality, when the video signal is seen by the monitor, no adverse visual influence occurs and the erroneous operation of the monitor can also be prevented.

By setting a number of various spurious signals SSP, by inhibiting the copy by limiting the number of generations as seen in the SCMS (Serial Copy Management System) or by increasing the costs which are required to make the illegal copy, illegal copying can be made more difficult.

A second embodiment of the invention will now be described with reference to FIG. 6. The second embodiment differs from the above embodiment in that a phase shift signal generating circuit 47 is arranged between the PLL circuit 30 and the buffer 40 in the reproducing system 25 in FIG. 2 and a change is given to the phase of the spurious signal SSP to be multiplexed by the phase shift signal generating circuit 47. Namely, in the case of a single continuous wave, there is a concern that the spurious signal SSP is eliminated by using the comb-shaped filter. Therefore, in the second embodiment, two kinds of phrase changes [0 and π] are given to the spurious signal SSP of the frequency [N·fh]. Therefore, the description of the recording system 2 is omitted in the second embodiment. The component elements similar to those in the above embodiment are designated by the same reference numerals and overlapping descriptions are omitted.

The signal of the horizontal frequency fh generated from the reproduction signal processing circuit 26 is supplied to a PLL circuit 45. The luminance signal Y is supplied to the arithmetic operating circuit 31. In FIG. 6, since the spurious signal SSP is not multiplexed with the color difference signals PR and PB, the descriptions and drawings of the color difference signals PR and PB are omitted. The phase comparing circuit 33 in the PLL circuit 45 compares the phases of the foregoing reproduced signal of the horizontal frequency fh and the signal of the frequency fh which is supplied from a frequency dividing circuit 46 and generates a phase difference. The phase difference is supplied to the VCO 35 through the low pass filter 34. The VCO 35 generates the spurious signal SSP of the frequency [N·fh]. The spurious signal SSP is supplied to the phase shift signal generating circuit 47 and is returned to the frequency dividing circuit 46. The frequency dividing circuit 46 divides the frequency of the spurious signal SSP generated from the VCO 35 by a predetermined frequency dividing ratio [N], thereby obtaining the horizontal frequency fh. The signal of the horizontal frequency fh is subsequently returned to the phase comparing circuit 33.

The phase shift signal generating circuit 47 is constructed by an inverter 48 and a switching circuit 49. The spurious signal SSP is supplied to a terminal 49a of the switching circuit 49 through the inverter 48 and is also supplied to a terminal 49c of the switching circuit 49. The connecting state of the switching circuit 49 is controlled synchronously with the horizontal sync signal of the reproduced video signal on a horizontal frequency fh unit basis in accordance with a switch control signal SSW1 which is supplied from a terminal 50. For example, when the switch control signal SSW1 is at the high level, terminals 49a and 49b are connected. When the signal SSW1 is at the low level, terminals 49c and 49b are connected.

Assuming that the spurious signal SSP which is taken out from the terminal 49a through the inverter 48 has the phase of [π] and that the spurious signal SSP which is taken out from the terminal 49c has the phase of [0], the switching circuit 49 is controlled by the switch control signal SSW1 in a manner such that a repetitive period and a repetitive permutation of a change in phase of the spurious signal SSP become random as shown below. One of the two spurious signals SSP of different phases is selected.

(1) 00π00π . . .

(2) π0ππ0π . . .

(3) 0π0π . . .

(4) 0π0π00π0π . . .

The repetitive period and repetitive permutation of the phase are not limited to the foregoing examples but may also be set to other examples because it is sufficient that the repetitive period and repetitive permutation of the phase become random.

The spurious signal SSP in which the repetitive period and repetitive permutation of the phase are made random as mentioned above is generated from the phase shift signal generating circuit 47 and is supplied to the terminal 41a of the switching circuit 41 through the inverter 40. When the switch control signal SSW which is supplied from the inhibition control circuit 42 is, for instance, at the high level, the switching circuit 41 is closed, so that the spurious signal SSP is supplied to the arithmetic operating circuit 31. When the switch control signal SSW is at the low level, the switching circuit 41 is opened, so that the spurious signal SSP is not supplied to the operating circuit 31.

The arithmetic operating circuit 31 multiplexes the above spurious signal SSP with the luminance signal Y which is supplied from the reproduction signal processing circuit 26, thereby forming the luminance signal Y0. The luminance signal Y0 is taken out from the terminal 29. When the spurious signal SSP is not supplied, the luminance signal Y which is supplied from the reproduction signal processing circuit 26 is directly supplied to the terminal 29 and is taken out from the terminal 29.

For instance, the case where the pattern [0π0π·] of (3) among the phase changing patterns mentioned above is selected will now be described. Since the connecting state of the switching circuit 49 is switched every horizontal frequency fh by the switch control signal SSW1, the spurious signal SSP of the phase [0] is first taken out from the switching circuit 49. Then, the spurious signal SSP of the phase [π] is taken out. Therefore, the phases of the spurious signals SSP which are selected from the switching circuit 49 with respect to the adjacent lines are always in the inverted relation.

When the above spurious signal SSP is supplied from the switching circuit 49 and multiplexed to the luminance signal Y by the arithmetic operating circuit 31 through the inverter 40 and the switching circuit 41, the frequency spectrum of the spurious signal SSP is located at the frequency [(N+(½))·fh] as mentioned above. As shown in FIG. 5, therefore, the interleaved relation is maintained between the spurious signal SSP and the luminance signal Y. Therefore, in the case where copying of the reproduced video signal is inhibited, in addition to the foregoing effects of the embodiment, the phase of the spurious signal SSP is changed at random to either one of the phases [0 and π] on a line unit basis. Therefore, in order to eliminate the spurious signal SSP as a copy inhibition signal, a frame comb-shaped filter using a frame memory must be used instead of the simple comb-shaped filter. Consequently, substantial cost and labor are required to copy the video signal. The other contents are substantially the same as those in the foregoing embodiment and their overlapping descriptions are omitted.

A third embodiment of the invention will now be described with reference to FIG. 6. This further embodiment differs from the above two embodiments with respect to the manner in which the connecting state of the switching circuit 41 is controlled by the inhibition control circuit 42. The component elements similar to those in the foregoing two embodiments are designated by the same reference numerals and their overlapping descriptions are omitted.

Figure 6:
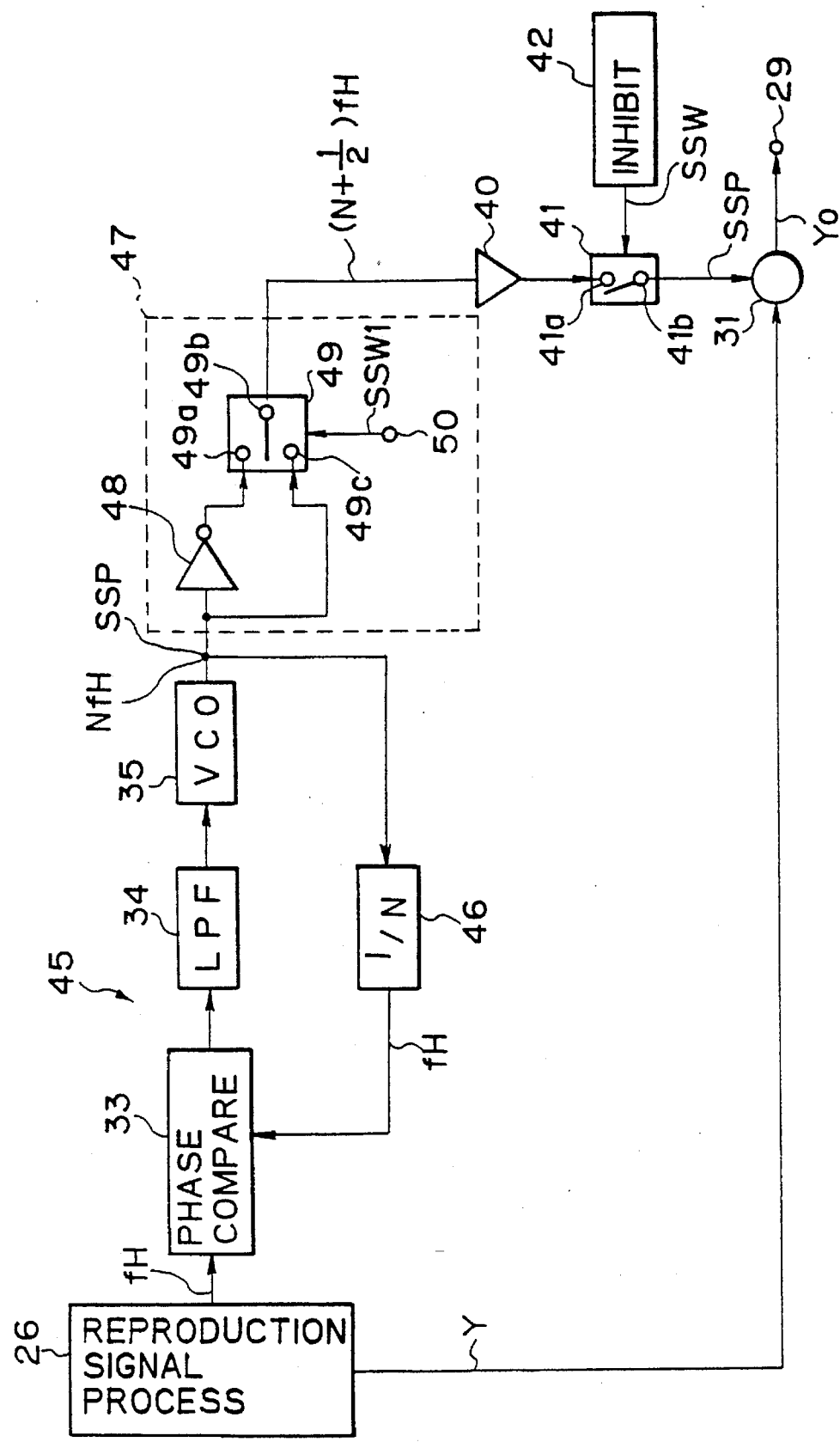
FIG. 6 is a block diagram of a reproducing system of the video tape recorder.

In FIG. 6, the spurious signal SSP is supplied to the switching circuit 49.

The connecting state of the switching circuit 49 is controlled in accordance with the phase change pattern [0π0π·] of (3) used in the second embodiment. The spurious signal SSP whose phase is inverted every line is selected. Thus, the frequency spectrum of the spurious signal SSP is located at the frequencies [(N+(½))·fh]. As shown in FIG. 5, the interleaved relation is held between the spurious signal SSP and the luminance signal Y. The spurious signal SSP is supplied from the switching circuit 49 to the terminal 41a of the switching circuit 41 through the buffer 40. The connecting state of the switching circuit 41 is controlled by the switch control signal SSW synchronously with the horizontal sync signal and on a unit basis of the horizontal scan line. That is, only for the horizontal scanning period when the spurious signal SSP is multiplexed, the terminals 41a and 41b of the switching circuit 41 are connected, the switching circuit 41 is closed, and the spurious signal SSP is supplied to the arithmetic operating circuit 31.

The arithmetic operating circuit 31 multiplexes the spurious signal SSP with the luminance signal Y supplied from the reproduction signal processing circuit 26, thereby forming the luminance signal Y0. The luminance signal Y0 is taken out from the terminal 29. When the spurious signal SSP is not supplied, the luminance signal Y which is supplied from the reproduction signal processing circuit 26 is directly transferred to the terminal 29 and is taken out from the terminal 29.

There are various kinds of multiplex patterns of the spurious signal SSP. For instance, there is a pattern such that the spurious signal is multiplexed with the first to third lines and is not multiplexed with the fourth and fifth lines. The above multiplex pattern is not limited to the foregoing example but the period of the pattern can be also changed.

Although the third embodiment is based on the construction of FIG. 6, the invention is not limited to such a construction but the invention can be also applied to the foregoing construction of FIG. 2. Since the other contents are substantially the same as those in the foregoing other embodiment, their overlapping descriptions are omitted.

Thus, in the case where copying of the reproduced video signal is inhibited, in addition to the effects of the foregoing embodiment, the line with which the spurious signal SSP is multiplexed changes in accordance with a predetermined pattern. Therefore, to eliminate the spurious signal SSP as a copy inhibition signal, a frame comb-shaped filter using a frame memory must be used instead of the simple comb-shaped filter. Substantial cost and labor are required to copy the video signal.

According to the invention, copying of a video signal with which a spurious signal is multiplexed can be certainly and easily inhibited. There is no need to provide a circuit, cables, terminals, and the like of another system different from those of the video signal as in the prior art. Accordingly, it is possible to prevent system complication and additional costs. Since substantial cost is required to release the copy inhibition, the copy preventing function can be certainly maintained with certainty and standardization can be easily achieved. Further, when the video signal is reproduced and seen by the monitor display, the spurious signal is multiplexed with the video signal at a level such as not to exert an influence on the picture quality. Thus, when the reproduced video signal is seen by the monitor display, the occurrence of an adverse visual influence can be prevented. By setting a number of various spurious signals, by inhibiting copying by limiting the number of generations as seen in the SCMS or by increasing the costs which are required to copying, the illegal copy can be made more difficult.

What is claimed is:

1. A video signal recording apparatus, comprising:

an input terminal for receiving a video signal;

recording means for recording said video signal on a recording medium;

detecting means for detecting a copy-inhibit signal combined with said video signal and having a frequency substantially equal to (N+(½)·fh±fv/2, where N is an integer, fh is a horizontal frequency of said video signal and fv is a vertical frequency of said video signal; and control means for inhibiting operation of said recording means upon detection of said copy-inhibit signal by said detecting means.

2. The video recording apparatus of claim 1, wherein said recording means comprises video tape recording means for recording said video signal on a video tape.

3. The video recording apparatus of claim 2, wherein said detecting means includes comb filter means for separating the copy-inhibit signal from the video signal.

* * * * *